United States Patent
He et al.

(10) Patent No.: US 10,149,346 B2
(45) Date of Patent: Dec. 4, 2018

(54) METHOD AND APPARATUS FOR ESTABLISHING VOLTE CALL

(71) Applicant: Telefonaktiebolaget LM Ericsson (publ), Stockholm (SE)

(72) Inventors: Yingjiao He, Shanghai (CN); Juying Gan, Shanghai (CN); Chengqiong Xie, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 6 days.

(21) Appl. No.: 15/512,162

(22) PCT Filed: Oct. 31, 2014

(86) PCT No.: PCT/CN2014/089996
§ 371 (c)(1),
(2) Date: Mar. 17, 2017

(87) PCT Pub. No.: WO2016/065601
PCT Pub. Date: May 6, 2016

(65) Prior Publication Data
US 2017/0280503 A1 Sep. 28, 2017

(51) Int. Cl.
*H04W 76/10* (2018.01)
*H04W 76/36* (2018.01)
(Continued)

(52) U.S. Cl.
CPC ........... *H04W 76/36* (2018.02); *H04W 76/10* (2018.02); *H04W 76/16* (2018.02); *H04W 76/25* (2018.02); *H04W 76/38* (2018.02)

(58) Field of Classification Search
CPC ..... H04W 76/36; H04W 76/38; H04W 76/25; H04W 76/16; H04W 76/045; H04W 76/026; H04W 76/068; H04W 76/066
See application file for complete search history.

(56) References Cited

U.S. PATENT DOCUMENTS

| 2014/0011492 A1* | 1/2014 | Bharadwaj .......... H04L 65/1016 455/422.1 |
| 2014/0185526 A1 | 7/2014 | Aksu et al. |

(Continued)

FOREIGN PATENT DOCUMENTS

| EP | 2683183 A1 | 1/2014 |
| KR | 102014065492 A1 | 5/2014 |

(Continued)

OTHER PUBLICATIONS

International Search Report and Written Opinion dated Jul. 15, 2015 for International Application Serial No. PCT/CN2014/089996, International Filing Date: Oct. 31, 2014 consisting of 7-pages.

(Continued)

*Primary Examiner* — Lakeram Jangbahadur
(74) *Attorney, Agent, or Firm* — Christopher & Weisberg, P.A.

(57) ABSTRACT

A method and apparatus for establishing a Voice over LTE (Long Term Evolution) (VoLTE) call in a communication network are provided. After a request for establishing a VoLTE call is received, a user equipment (UE) involved in the VoLTE call that is in LTE coverage can be identified. One or more dummy messages are send to the identified UE after the VoLTE call enters into ringing phase. An interval between successive dummy messages is shorter than a first time period set for determining whether to release radio resource for supporting the VoLTE call in LTE coverage. Sending the dummy message can be stopped if the VoLTE call is answered or is cancelled. As a consequence, time spending on establishing a VoLTE call is shortened and good performance characteristics is achieved, and signallings on networks are reduced.

17 Claims, 6 Drawing Sheets

(51) Int. Cl.
*H04W 76/38* (2018.01)
*H04W 76/25* (2018.01)
*H04W 76/16* (2018.01)

(56) References Cited

U.S. PATENT DOCUMENTS

| | | | | |
|---|---|---|---|---|
| 2015/0131650 | A1* | 5/2015 | Shuman | H04L 65/80 370/352 |
| 2015/0201454 | A1* | 7/2015 | Shukair | H04W 76/045 370/329 |
| 2016/0360556 | A1* | 12/2016 | Jeong | H04W 76/10 |

FOREIGN PATENT DOCUMENTS

| | | |
|---|---|---|
| WO | 2013174440 A1 | 11/2013 |
| WO | 2014127533 A1 | 8/2014 |

OTHER PUBLICATIONS

J. Rosenberg, et al., Title: "SIP: Session Initiation Protocol,"Network Working Group, Request for Comments: 3261, Obsoletes: 2543, Category: Standards Track, Jun. 2002 consisting of 269-pages.
3GPP TS 23.401 V12.3.0 (Dec. 2013) 3rd Generation Partnership Project; Technical Specification Group Services and System Aspects; General Packet Radio Service (GPRS) Enhancements for Evolved Universal Terrestrial Radio Access Network (E-UTRAN) Access (Release 12) Dec. 17, 2013 consisting of 302-pages.
3GPP TS 29.274 V12.3.0 (Dec. 2013) 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12) Dec. 17, 2013 consisting of 236-pages.
3GPP TS 36.413 V12.0.0 (Dec. 2013) 3rd Generation Partnership Project; Technical Specification Group Radio Access Network; Evolved Universal Terrestrial Radio Access Network (E-UTRAN); S1 Application Protocol (S1AP) (Release 12) Dec. 19, 2013 consisting of 278-pages.
3GPP TS 24.229 V12.3.0 (Dec. 2013) 3rd Generation Partnership Project; Technical Specification Group Core Network and Terminals; IP Multimedia Call Control Protocol Based on Session Initiation Protocol (SIP) and Session Description Protocol (SDP); Stage 3 (Release 12) Dec. 20, 2013 consisting of 821-pages.
Supplementary European Search Report dated Apr. 16, 2018 for European Application No. EP14904691 filed on Apr. 10, 2017, consisting of 7-pages.
GSM Association, Official Document FCM.01—VoLTE Service Description and Implementation Guidelines, Version 1.1, Mar. 26, 2104, consisting of 121-pages.
3GPP TS 36A13 V12.0.0; 3rd Generation Partnership Project; Technical Specification Group Radio Access Network; Evolved Universal Terrestrial Radio Access Network (E-UTRAN); S1 Application Protocol (S1AP); (Release 12); Dec. 2013, consisting of 278-pages.

* cited by examiner

METHOD AND APPARATUS FOR ESTABLISHING VOLTE CALL

CROSS-REFERENCE TO RELATED APPLICATIONS

This application is a Submission Under 35 U.S.C. § 371 for U.S. National Stage Patent Application of International Application Number: PCT/CN2014/089996, filed Oct. 31, 2014 entitled "METHOD AND APPARATUS FOR ESTABLISHING VOLTE CALL," the entirety of which is incorporated herein by reference.

TECHNICAL FIELD

The present invention relates generally to the field of communication, and particularly to a method and apparatus for establishing a Voice over LTE (Long Term Evolution) (VoLTE) call in a communication network.

BACKGROUND

The 3rd Generation Partnership Project (3GPP) Long Term Evolution (LTE) standard promises to deliver efficient mobile broadband and multimedia communication services. In keeping with this objective, it was developed to include the features needed to effectively support Voice-over-IP (VoIP) media and control. VoLTE is emerging as a process designed to couple IP Multimedia Subsystems (IMS) and LTE to create an environment capable of supporting voice traffic in a shared packet data network.

Evolved-UMTS (Universal Mobile Telecommunications System) Terrestrial Radio Access Network (E-UTRAN) is adopted to provide LTE coverage and User equipments (UE) connect to E-UTRAN via eNodeBs. When establishing a VoLTE call, E-UTRAN Radio Access Bearer (E-RAB) is established between UE and EPC for supporting Session Initiation Protocol (SIP) session with IMS.

In LTE technology, an Inactivity timer is set in eNodeB for monitoring user inactivity on E-RAB. User Inactivity means network (e.g. eNodeB) discovers that for a certain time period (defined by the value of the "inactivity" timer) no user plane packets are exchanged between UE and the network. On expiration of the Inactivity timer, network releases E-RAB to save radio resources and hence UE is forced to enter idle mode. Once the E-RAB is torn down/released, the UE is put in idle mode. When the user comes out of idle mode (due to traffic, paging etc.), the UE has to reestablish the E-RAB.

During a SIP session for establishing a VoLTE call, E-RAB will be also torn down in case an inactivity timer expires, which means E-RAB will be released while a SIP session has not been completed. Since E-RAB need be reestablished when the SIP session is to be continued, the release and reestablishment of E-RAB introduce additional latency in establishing the VoLTE call and require more signallings between UE and EPC. This will result in poor user experience (i.e. long call setup/cancellation time) for VoLTE call service. For network operators, there are quite many network resources wasting on signallings of release and re-establishment of E-RAB. Furthermore, the network performance will be degraded. For example, as a Key Performance Indicator (KPI), VoLTE call setup time will be longer than Circuit Switch (CS) calls.

SUMMARY

An object of the present invention is to provide an improved method and apparatus, which obviates at least some of the above-mentioned disadvantages.

According to a first aspect of the present invention, the present invention provides a method for establishing a VoLTE call in a communication network. The method comprises steps of: receiving a request for establishing a VoLTE call; identifying a UE involved in the VoLTE call that is in LTE coverage; sending one or more dummy messages to the identified UE after the VoLTE call enters into ringing phase, wherein an interval between successive dummy messages is shorter than a first time period set for determining whether to release radio resource for supporting the VoLTE call in LTE coverage; and stopping sending the dummy message if the VoLTE call is answered or is cancelled.

According to a second aspect of the present invention, the present invention provides an apparatus for establishing a VoLTE call in a communication network. The apparatus comprises: communication interface being adapted to receive a request for establishing a VoLTE call; identification module being adapted to identify a UE involved in the VoLTE call that is in LTE coverage; control module being adapted to send one or more dummy messages through the communication interface to the identified UE after the VoLTE call enters into ringing phase and stop sending the dummy message if the VoLTE call is answered or is cancelled, wherein an interval between successive dummy messages shorter than a first time period set for determining whether to release radio resource for supporting the VoLTE call in LTE coverage.

As a consequence, time spending on establishing a VoLTE call is shortened and good performance characteristics, such as KPI, is achieved, and signallings on networks are reduced.

BRIEF DESCRIPTION OF THE DRAWINGS

The foregoing and other objects, features, and advantages of the present invention will become more apparent from the following description of preferred embodiments and accompany drawings.

DETAILED DESCRIPTION

In the following description, for purposes of explanation rather than limitation, specific details, such as the particular architecture, interfaces, techniques, etc., are set forth for illustration. However, as will be apparent to those of ordinary skill in the art, other embodiments that depart from these specific details would still be understood to be within the scope of the present invention. Moreover, for the purpose of clarity, detailed descriptions of well-known devices, circuits, and methods are omitted so as not to obscure the description of the present invention. It should be expressly understood that the drawings are included for illustrative purposes and do not represent the scope of the present invention. In the accompanying drawings, like reference numbers in different drawings may designate similar elements.

As used herein, the terms "user equipment (UE)", "terminal" and "client" are used interchangeably to refer to any one or all of cellular phones, smart phones, personal or mobile multi-media terminal, personal data assistants (PDA's), laptop computers, tablet computers or the like.

As used herein, the terms "LTE coverage" and "LTE network" are used interchangeably to refer to an environment where services are delivered in accordance with LTE standard.

As used herein, the terms "VoLTE UE", "VoLTE-capable UE", "VoLTE terminal", "VoLTE client" are used interchangeably to refer to a UE that is in LTE coverage and is capable of originating or terminating a VoLTE call. Accordingly, the term "non-VoLTE UE" refers to a UE that is incapable of originating or terminating a VoLTE call.

Figure 1:
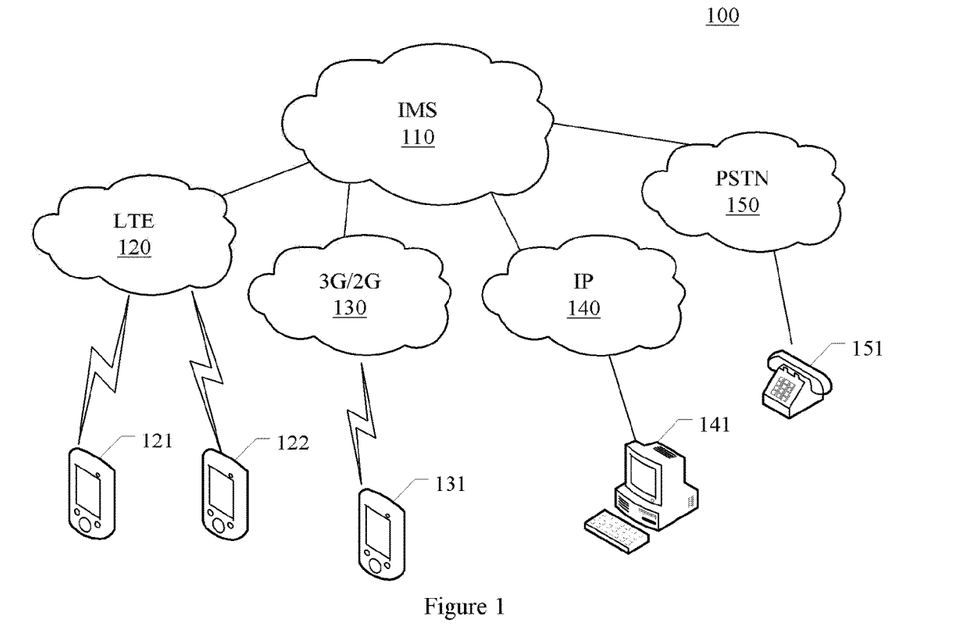
FIG. 1 illustrates an environment in which a VoLTE call may be established.

FIG. 1 illustrates an environment 100 in which a VoLTE call may be established. The environment 100 may comprises IMS 110 and one or more wireless or wired networks, such as LTE network 120, 3G/2G network 130, Internet Protocol (IP) network 140 and/or Public Switched Telephone Network (PSTN) network 150.

These networks connect to IMS 110 to deliver IP multimedia services to their respective UEs. For the purpose of illustration, several UEs are shown on FIG. 1, which access the environment thought different networks, such as UEs 121, 122 via LTE network 120, UE 131 via 3G/2G network 130, UE 141 via IP network 140 and UE 151 via PSTN network 150 etc.

A VoLTE call may be established between two VoLTE UEs 121, 122. The two VoLTE UEs may be in LTE coverage served by same LTE network or different LTE networks, or they may be handled with same Evolved Packet Core (EPC) or different EPCs. Alternatively, a VoLTE call may be established between a VoLTE UE and a non-VoLTE UE, i.e. a UE in other networks than LTE network, such as UEs 131, 141, 151 on FIG. 1. A VoLTE UE may act as either an originating UE or a terminating UE in the VoLTE call.

IMS 110 comprises an application server that hosts and executes services. An example of an application server that is specified in 3GPP is employed for Voice services. In order to support a voice call, e.g. a VoLTE call, a SIP session is established between a VoLTE UE and an application server in IMS 110.

In existing VoLTE solution, when UE-A (originating UE) makes a call to UE-B (terminating UE), a SIP session is established for this call. After SIP 180 RINGING message, there may be no payload/user plane packets (e.g. SIP message) in Evolved Packet System (EPS) before the call is answered or cancelled. When answer time (i.e. time elapsed before UE-B answers the call) or ringing time (i.e. a time period predefined for ringing before the call is cancelled) exceeds time value of an inactivity timer in the eNodeB, E-RAB may be released while the SIP session has not been completed. For example, in an existing LTE network, the value of an eNodeB inactivity timer is 10s, while the value of ringing time is much longer than that, e.g. from 30-60s.

After that, when the SIP session is to be continued, for example, UE-B answers the call, or the call is cancelled either by UE-A initiatively or due to expiry of the ringing timer, E-RAB need be re-established to support the SIP session.

Figure 2A:
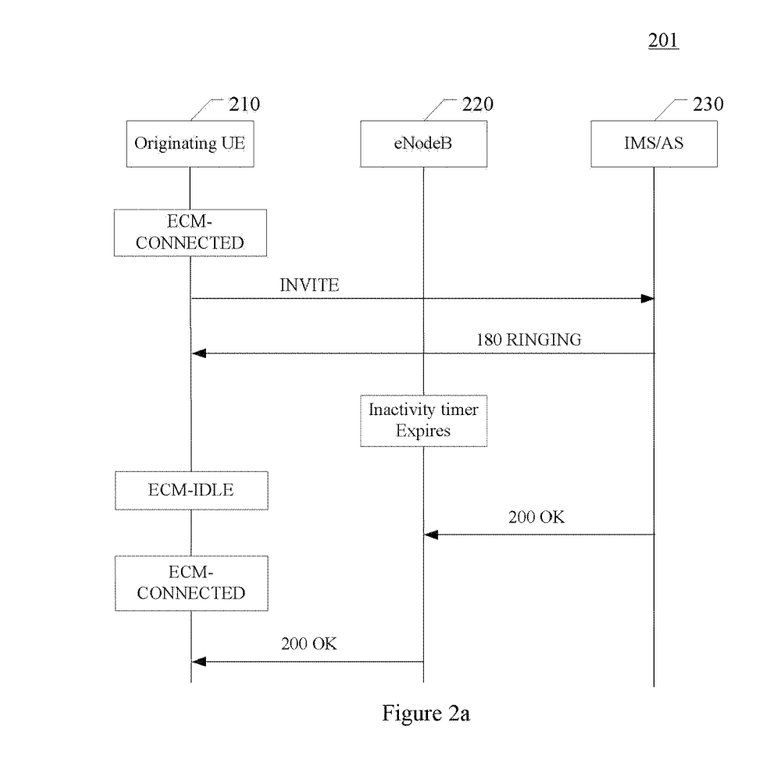
FIGS. 2a and 2b illustrate a first process for establishing a VoLTE call in a communication network according to prior art.
Figure 2B:
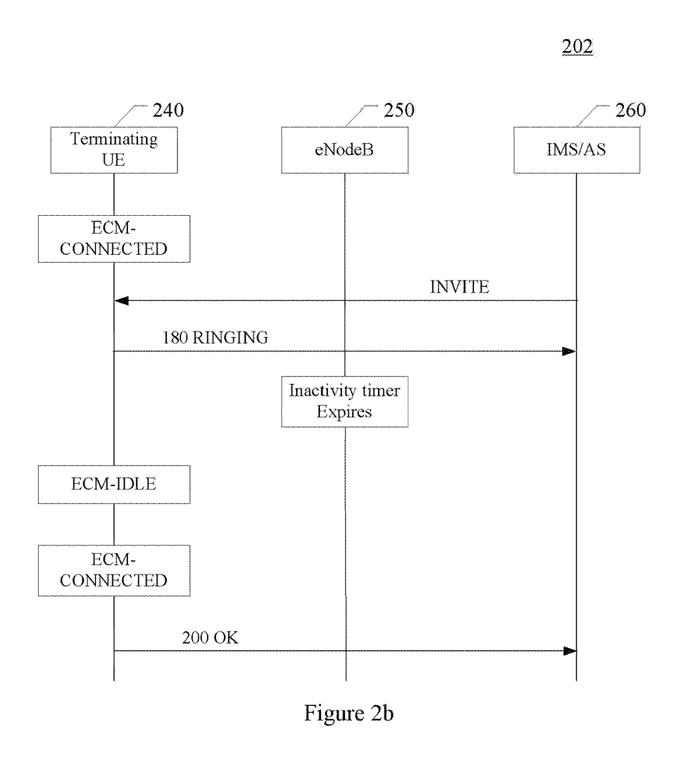

FIGS. 2a and 2b illustrate a first process for establishing a VoLTE call in a communication network according to prior art.

FIG. 2a illustrates a process 201 from an originating UE aspect, in which process an originating UE 210 makes a VoLTE call by means of an eNodeB 220 and an Application Server in IMS (IMS/AS) 230, and the VoLTE call is answered.

As shown on FIG. 2a, when the originating UE 210 is to make a VoLTE call to a terminating UE, it may initiate a service request procedure to change its status from ECM (EPS connection Management)-IDLE to ECM-CONNECTED. ECM-CONNECTED means E-RAB is established between UE 210 and EPC. To start a SIP session, UE 210 sends SIP INVITE message to IMS/AS 230 via eNodeB 220. IMS/AS 230 transfers SIP 180 RINGING message to UE 210 upon receipt of SIP 180 RINGING message from the terminating UE.

An inactivity timer in eNodeB 220 is set to expire when there is no user plane packet on E-RAB established between UE 210 and EPC in a predefined time period. If no user plane packets are exchanged on E-RAB, i.e. E-RAB is unused, at expiration of the inactivity timer, the E-RAB is released, and UE 210 changes to ECM-IDLE status. At this time, since the call is neither answered nor cancelled, the SIP session is not completed.

Thereafter, as shown on FIG. 2a, IMS/AS 230 may receive a SIP answer message (200 OK [INVITE]) for answering the call from the terminating UE. Upon receipt of the SIP answer message, IMS/AS 230 transfers it to the VoLTE UE via EPC. This results in Network Triggered Service Request procedure to change status of UE 210 from ECM-IDLE to ECM-CONNECTED again. This means E-RAB between UE 210 and EPC is reestablished for continuing the SIP session. When UE 210 is in ECM-CONNECTED status, the SIP answer message is sent to it.

FIG. 2b illustrates a process 202 from a terminating UE aspect, in which process a terminating UE 240 receives a VoLTE call by means of an eNodeB 250 and IMS/AS 260, and UE 240 answers the VoLTE call.

As shown on FIG. 2b, the terminating UE 240 is initially in ECM-IDLE status when it is called and a SIP session is to be established with it. Then, a service request procedure may be initiated which results in change of status of UE 240 from ECM-IDLE to ECM-CONNECTED. After that, SIP INVITE message is sent to UE 240. In response, UE 240 may send SIP 180 RINGING message to IMS/AS 260.

An inactivity timer in eNodeB 250 is set for monitoring whether there are user plane packets on E-RAB established between UE 240 and EPC in a predefined time period. If no user plane packets are exchanged on E-RAB (i.e. E-RAB is unused) at expiration of the inactivity timer, the E-RAB is released, and UE 240 changes to ECM-IDLE status. At this time, since the call is neither answered nor cancelled, the SIP session is not completed.

When UE 240 is to answer the call, a service request procedure is initiated to change its status from ECM-IDLE to ECM-CONNECTED again. This means E-RAB between UE 240 and EPC is reestablished for continuing the SIP session. When UE 240 is in ECM-CONNECTED status, it sends an SIP answer message (200 OK [INVITE]) to IMS/AS 260.

As will be appreciated, during both process 201 and process 202, since the answer time is longer than time value of the eNodeB inactivity timer, E-RAB is released while a SIP session has not been completed, and need be reestablished when the call is answered. The release and reestablishment cause additional latency and more signallings.

Figure 3A:
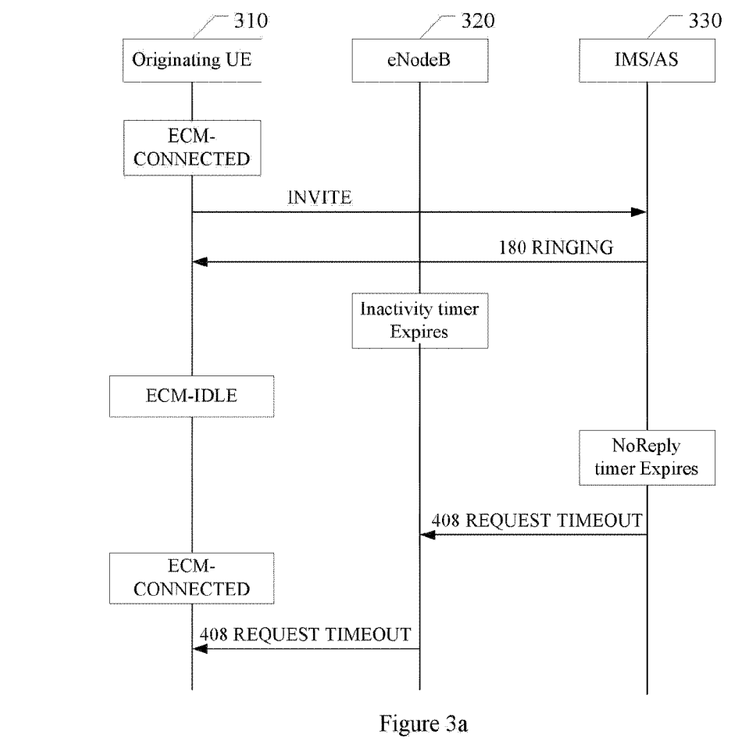
FIGS. 3a and 3b illustrate a second process for establishing a VoLTE call in a communication network according to prior art.
Figure 3B:
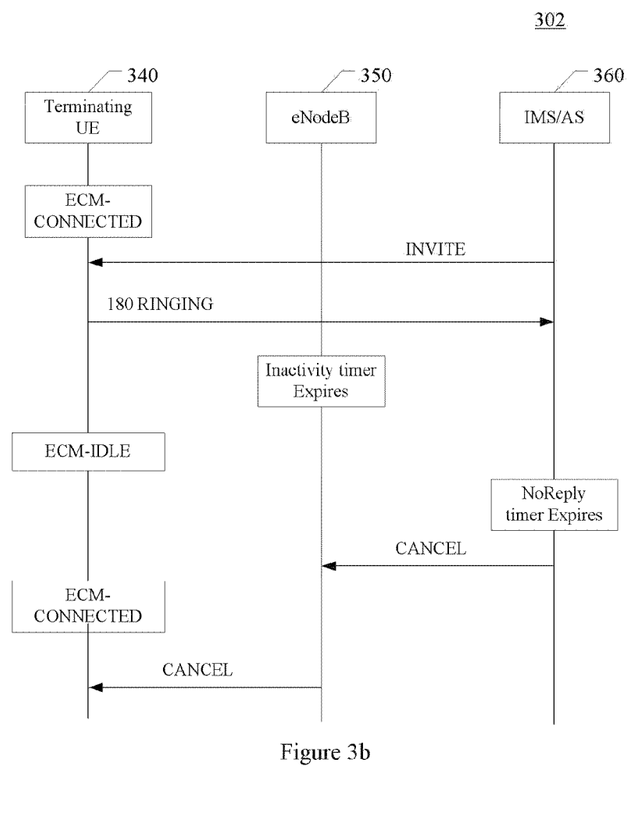

FIGS. 3a and 3b illustrate a second process for establishing a VoLTE call in a communication network according to prior art.

FIG. 3a illustrates a process 301 from an originating UE aspect, in which process an originating UE 310 makes a VoLTE call by means of an eNodeB 320 and an IMS/AS 330, and the VoLTE call is cancelled due to expiration of ringing time.

On FIG. 3a, the procedure before IMS/AS 330 sends SIP 180 RINGING message to UE 310 is the same as that on figure 2a. Similarly, an inactivity timer is set in eNodeB 320, and since after the RINGING message, no user plane packets are exchanged on E-RAB at expiration of the inactivity timer, the E-RAB is released, and UE 310 changes to ECM-IDLE status.

A ringing timer, e.g. a NoReply timer, is set in IMS/AS 230 to expire when the ringing time elapsed, i.e. a VoLTE call is not answered in ringing time. If the NoReply timer expires and no answer message is received, IMS/AS 230 may complete the SIP session by sending a SIP 408 REQUEST TIMEOUT message to UE 310 via EPC. This results in status change of UE 310 from ECM-IDLE to ECM-CONNECTED again. When UE 310 is in ECM-CONNECTED status, the SIP 408 REQUEST TIMEOUT message is sent to it.

As will be understood, UE 310 may initiatively cancel the call during the answer time or ringing time. When UE 310 decides to cancel the call and it is in ECM-IDLE status, a service request procedure will also be initiated to change its status to ECM-CONNECTED again. When UE 310 is in ECM-CONNECTED status, it sends SIP CANCEL message to IMS/AS 330.

FIG. 3b illustrates a process 302 from a terminating UE aspect, in which process a terminating UE 340 makes a VoLTE call by means of an eNodeB 350 and an IMS/AS 360, and the VoLTE call is cancelled.

On FIG. 3b, the procedure before UE 340 sends SIP 180 RINGING message to IMS/AS 360 is the same as that on figure 2b. Similarly, an inactivity timer is set in eNodeB 320. Since after the RINGING message, no user plane packets are exchanged on E-RAB at expiration of the inactivity timer, the E-RAB is released, and UE 340 changes to ECM-IDLE status.

Thereafter, when the call is to be cancelled either by the originating UE initiatively or due to expiration of the ringing timer, IMS/AS 360 completes the SIP session by sending a SIP CANCEL message to UE 340. This triggers reestablishment of E-RAB between UE 340 and EPC, which in turn results in a status change of UE 340 from ECM-IDLE to ECM-CONNECTED. When UE 340 is in ECM-CONNECTED status, the SIP CANCEL message is sent to it.

As will be appreciated, during both process 301 and process 302, since time value of the ringing timer is longer than the eNodeB inactivity timer, E-RAB is released while a SIP session has not been completed, and need be reestablished when the call is cancelled. This causes additional latency and more signallings.

Figure 4:
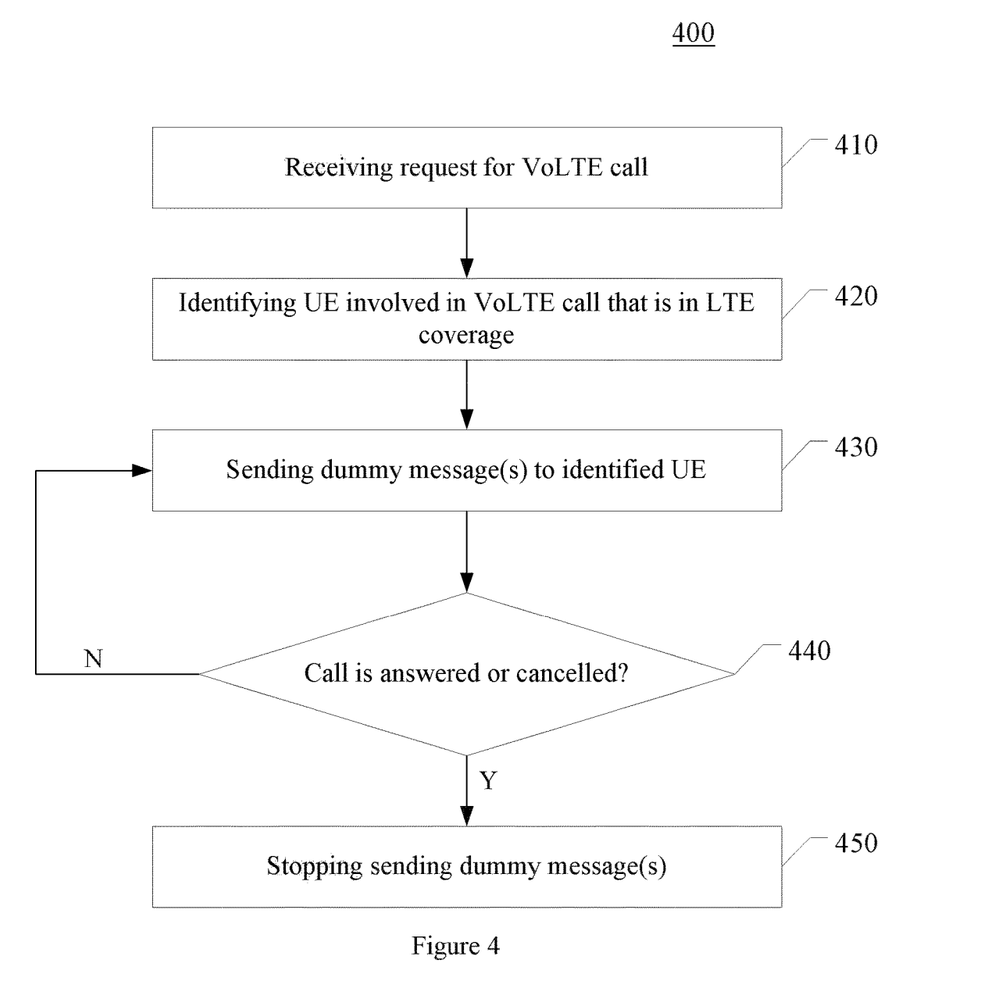
FIG. 4 illustrates a flow chart of a process according to an embodiment of the present invention.

FIG. 4 illustrates a flow chart of a process 400 according to an embodiment of the present invention. This process is for establishing a VoLTE call in a communication network. The communication network may comprise an IMS, a LTE network and other networks such as 3G/2G network, IP network and/or PSTN network, and it provides voice service to UEs that access through these networks. A VoLTE call may be established between two VoLTE UEs, or between a VoLTE UE and a non-VoLTE UEs. In a VoLTE call, a VoLTE UE could act as either an originating UE or a terminating UE. Preferably, this process may be performed in an application server in the IMS.

The process 400 begins with block 410, where a request for VoLTE call is received. This request may be e.g. a SIP INVITE message received from a VoLTE UE, i.e. a UE in LTE network, which makes the VoLTE call. Or this request may be received from a non-VoLTE UE, such as a UE in other networks like 3G/2G network, IP network and/or PSTN network, which originates a voice call towards a VoLTE UE.

As depicted at block 420, when the request is received, a UE involved in the VoLTE call that is in LTE coverage is identified. A UE involved in a call may refer to either an originating UE or a terminating UE of the call. In an embodiment, the request may contain access information, which may be analyzed to identify whether the originating UE or the terminating UE is in LTE coverage. Preferably, identification may be based on access information from e.g. P-Access-Network-Info header field as defined in 3GPP TS 24.229. A P-Access-Network-Info header field contains a cell identifier or location identifier, which may indicate whether a UE is located in LTE network. In an example, if both originating UE and terminating UE are in LTE network, then these two UEs are identified.

Thereafter, as described at block 430, one or more dummy messages are sent to the identified UE(s). The dummy message may be sent after the VoLTE call enters into ringing phase. An interval between successive dummy messages is set to be shorter than a first time period predefined for determining whether to release radio resource for supporting the VoLTE call in LTE network.

As an example, the dummy message may be dummy SIP OPTIONS message. Preferably, a VoLTE call may be determined as entering into ringing phase based on a ringing message that is sent to an originating UE or received from a terminating UE. The interval may be pre-configured to a fixed value, and then the dummy messages may be sent periodically at this pre-configured interval.

In an embodiment, the first time period is set so that if the radio resource is unused, e.g. no data packet is exchanged on the radio source, in the first time period, the radio resource will be released. An inactivity timer in eNodeB is set to expire when the first time period times out. For example, duration of the first time period may be equal to time value of the inactivity timer. The radio resource may be E-RAB established between the identified UE and EPC. As an example, the interval may be set to e.g. 8s when the inactivity timer is set to 10s.

During interval of successive dummy messages, it is determined whether the VoLTE call is answered or cancelled at block 440. If yes, the dummy messages will be continuously sent at block 430, and if no, the sending of dummy messages will be stopped at block 450.

In a preferred embodiment, a VoLTE call may be determined as being answered when an answer message is received from the terminating UE of the call. A VoLTE call may be cancelled when the originating UE initiatively cancels the call or the call is not answered at expiration of a second time period for ringing, i.e. a ringing time. In an example, a ringing timer, e.g. a NoReply timer, may be utilized to monitor the second time period, and the second time period is longer than the first time period. According to an embodiment, when a SIP CANCEL message is received from an originating UE or a NoReply timer for monitoring whether an answer message is received from a terminating UE within a predefined time period expires, the VoLTE call may be determined as being cancelled.

As illustrated at block 450, sending of the dummy messages is stopped if the VoLTE call is answered or cancelled.

As will be understood, when both the originating UE and the terminating UE of the VoLTE call are in LTE network, dummy messages may be sent to both UEs.

Although FIG. 4 is illustrated in context of LTE network, it would be appreciated that the present invention is also applicable to any of wireless network that in which radio resource for supporting the VoLTE call will be released if the radio resource is unused before a first time period times out.

With the process illustrated on FIG. 4, radio resource will not be released before a SIP session is completed, since data packets are continuously sent on the radio resource. This allows taking shorter time to establish or cancel a VoLTE call, thus providing better user experience. Besides, good performance, e.g. KPI characteristics, is achieved for network operators, and signallings e.g. in U-TRAN are saved.

Figure 5A:
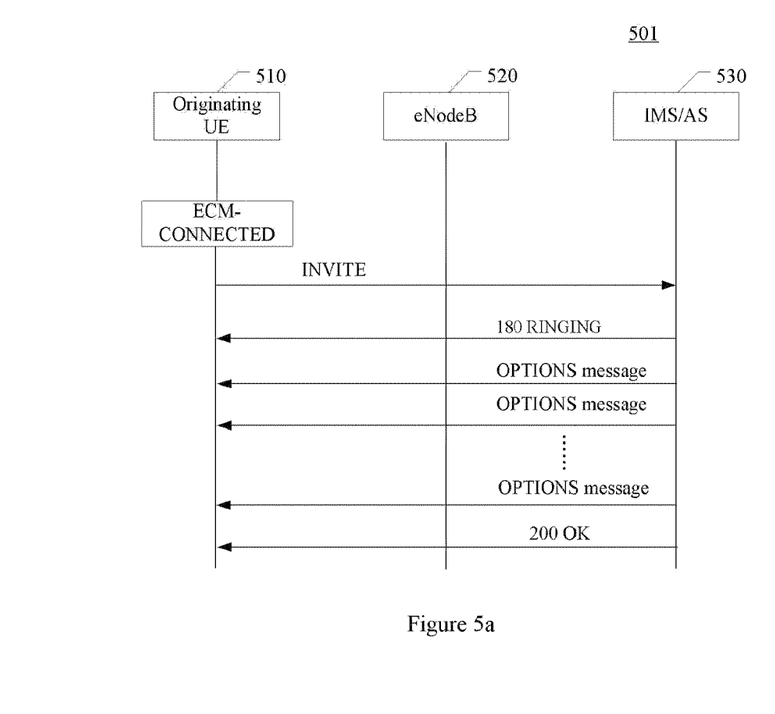
FIGS. 5a and 5b illustrate a process for according to an embodiment of the present invention.
Figure 5B:
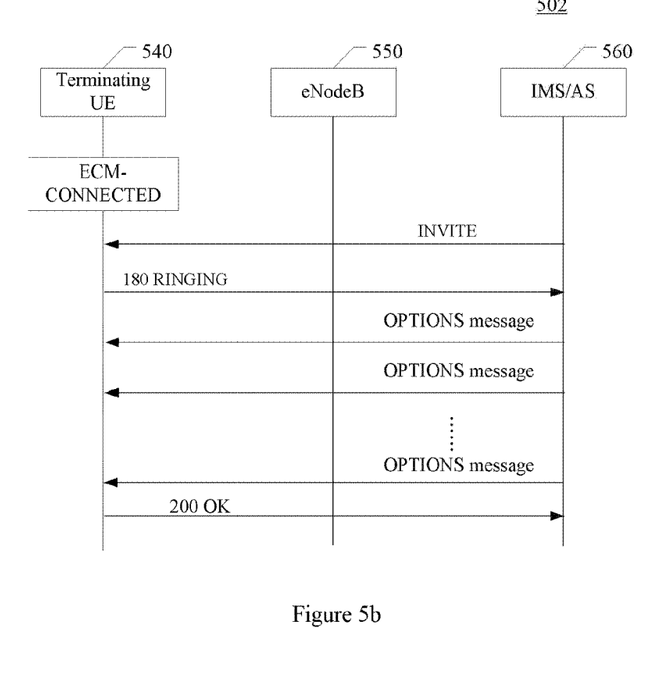

FIGS. 5a and 5b illustrate a process according to an embodiment of the present invention. This process is for establishing a VoLTE call in a communication network.

FIG. 5a illustrates a process 501 from an originating UE aspect, in which process an originating UE 510 makes a VoLTE call by means of an eNodeB 520 and an IMS/AS 530. This process may apply to SIP or other similar protocols.

As shown on figure 5a, when the originating UE 510 is to make a VoLTE call to a terminating UE, it may initiate a service request procedure to change its status from ECM-IDLE to ECM-CONNECTED. This means E-RAB is established between UE 510 and EPC. After UE 510 changes to ECM-CONNECTED status, it sends SIP INVITE message to IMS/AS 530 via eNodeB 520 to initiate a SIP session.

From the SIP INVITE message, e.g. its header field, IMS/AS 530 may identify that UE 510 is a VoLTE UE, that is, UE 510 is a UE in LTE coverage.

When IMS/AS 530 sends SIP 180 RINGING message to UE 510 upon receipt of SIP 180 RINGING message from the terminating UE, the VoLTE call enters its ringing phase.

Thereafter, IMS/AS 530 sends one or more dummy messages, such as SIP OPTIONS messages, to UE 510. In an example, the SIP OPTIONS messages may be sent periodically based on a pre-configured interval. Preferably, the pre-configured interval may be a bit shorter than time value of an inactivity timer in eNodeB 520. This would allow keeping E-RAB between UE 510 and EPC active with little traffic incurred in both IMS and LTE network.

IMS/AS 530 stops sending SIP OPTIONS messages when the call is answered or cancelled. As shown on FIG. 5a, when IMS/AS 530 receives a SIP answer message, such as 200 OK [INVITE], from the terminating UE, it stops sending SIP OPTIONS message and transfers the 200 OK message instead.

As will be understood, when the call is cancelled, for example, if IMS/AS 530 receives a SIP CANCEL message from UE 510, or if it decides to cancel the call due to expiration of a ringing timer, e.g. a NoReply timer, it will also stop sending SIP OPTIONS message to UE 510.

FIG. 5b illustrates a process 502 from a terminating UE aspect, in which process a terminating UE 540 receives a VoLTE call by means of an eNodeB 550 and an IMS/AS 560.

When a request for a voice call is received in IMS/AS 560, it determines from the request that the terminating UE is a VoLTE UE and then the voice call is a VoLTE call. This voice call may be made from a non-VoLTE UE, i.e. a UE in other networks e.g. 3G/2G network, IP network or PSTN network.

As shown on FIG. 5b, when the terminating UE 540 is called, a service request procedure may be initiated to change its status from ECM-IDLE to ECM-CONNECTED. This means E-RAB is established between EPC and UE 540, and then a SIP INVITE message from IMS/AS 550 may be transferred to UE 540 via eNodeB 550. In response, UE 540 may send SIP 180 RINGING message to IMS/AS 560. The RINGING message may indicate that the VoLTE call enters ringing phase.

After receiving SIP 180 RINGING message, IMS/AS 560 sends one or more dummy messages, such as SIP OPTIONS messages, to UE 540. The SIP OPTIONS messages may be sent periodically based on a pre-configured interval. The pre-configured interval may be a bit shorter than time value of an inactivity timer in eNodeB 550.

IMS/AS 560 stops sending SIP OPTIONS messages when the call is answered or cancelled. As shown on FIG. 5b, when IMS/AS 560 receives a SIP answer message, such as 200 OK [INVITE], from UE 540, it stops sending SIP OPTIONS message. As will be understood, when the call is cancelled, for example, if IMS/AS 530 receives a SIP CANCEL message from the originating UE, or if it decides to cancel the call due to expiration of a ringing timer, e.g. a NoReply timer, it will also stop sending SIP OPTIONS message to UE 540.

As will be appreciated, IMS/AS 530, 560 illustrated on FIGS. 5a and 5b may be one and the same IMS/AS, or they may be different IMS/ASs.

Figure 6:
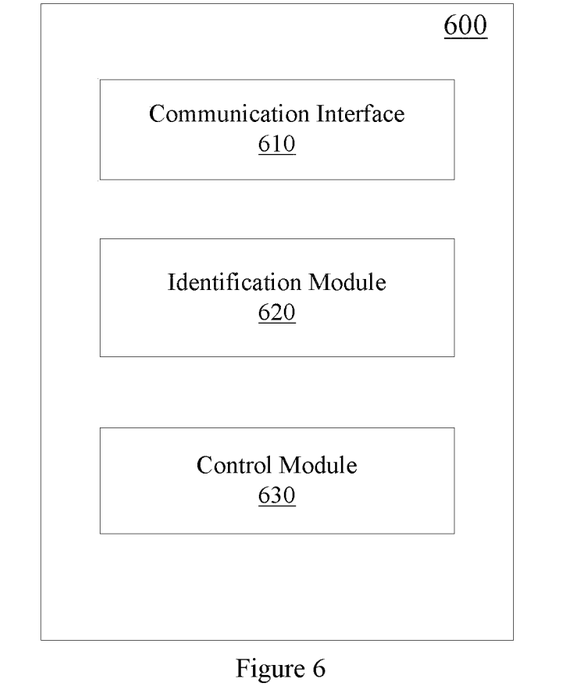
FIG. 6 illustrates a block diagram of an apparatus according to an embodiment of the present invention.

FIG. 6 illustrates a block diagram of an apparatus 600 according to an embodiment of the present invention. The apparatus 600 is for establishing a VoLTE call in a communication network. Preferably, the apparatus 600 may be implemented in an application server in IMS.

The apparatus 600 may comprise a communication interface 610, an identification module 620, and a control module 630, which are operatively coupled together.

The communication interface 610 may be adapted to receive a request for establishing a VoLTE call. The communication interface 610 is configured to receive a request from any of wireless or wired networks, such as LTE network, 3G/2G network, IP network or PSTN network.

The identification module 620 may be adapted to identify a UE involved in the VoLTE call that is in LTE coverage provided by LTE network(s). For example, the identification module 620 may comprises a header analyzer to analyze header fields comprised in the request to determine whether the originating UE or terminating UE is in LTE coverage.

The control module 630 may be adapted to send one or more dummy messages through the communication interface 610 to the identified UE. The control module 630 sends the dummy messages after the VoLTE call enters into ringing phase, and stops sending when the VoLTE call is answered or is cancelled. An interval between successive dummy messages is set to be shorter than a first time period set for determining whether to release radio resource for supporting the VoLTE call in LTE coverage.

In an embodiment, the apparatus may comprise a ringing timer, e.g. a No-Reply timer. The ringing timer is set to expire when a VoLTE call is not answered in a second time period. The control module 630 may be adapted to stop sending dummy message when the ringing timer expires.

It would be understood that all of processes according to the present invention, such as processes illustrated above with reference to FIGS. 4, 5a, 5b, may be implemented in connect with the apparatus 600.

As will be appreciated by one of skill in the art, the present invention may be embodied as a method, apparatus, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method for establishing a Voice over LTE (VoLTE) call in a communication network, the method comprising:
receiving a request for establishing the VoLTE call;
identifying a user equipment (UE) involved in the VoLTE call that is in LTE coverage;
sending at least one dummy message to the identified UE after the VoLTE call enters into ringing phase, an interval between successive dummy messages being shorter than a first time period set for determining whether to release radio resource in LTE coverage for supporting the VoLTE call;
stopping sending the at least one dummy message if the VoLTE call is one of answered and cancelled; and
the VoLTE call is determined as being cancelled when one of receiving a cancel message from an originating UE of the VoLTE call and receiving no answer message from a terminating UE of the VoLTE call over a second time period that is longer than the first time period.

2. The method according to claim 1, wherein sending the at least one dummy message comprises periodically sending the at least one dummy message at a pre-configured interval that is shorter than the first time period.

3. The method according to claim 1, wherein the at least one dummy message is a dummy SIP OPTIONS message.

4. The method according to claim 1, wherein the VoLTE call entering into ringing phase is determined based on one of receipt of a ringing message from the identified UE and sending of a ringing message to the identified UE.

5. The method according to claim 1, wherein the first time period is set so that, if the radio resource is unused for exchanging data packet in the first time period, the radio resource is released.

6. The method according to claim 1, wherein the identifying comprises identifying that both an originating UE and a terminating UE of the VoLTE call are in LTE coverage, and the sending comprises sending at least one dummy message to both the originating UE and the terminating UE.

7. An apparatus for establishing a Voice over LTE (VoLTE) call in a communication network, the apparatus comprising:
a communication interface configured to receive a request for establishing the VoLTE call;
an identification circuit configured to identify a user equipment (UE) involved in the VoLTE call that is in LTE coverage; and
a control circuit configured to:
send at least one dummy message through the communication interface to the identified UE after the VoLTE call enters into ringing phase, an interval between successive dummy messages being shorter than a first time period set for determining whether to release radio resource for supporting the VoLTE call in LTE coverage;
stop sending the at least one dummy message if the VoLTE call is one of answered and cancelled; and
determine that the VoLTE call is cancelled when receiving one of a cancel message from an originating UE of the VoLTE call and receiving no answer message from a terminating UE of the VoLTE call over a second time period that is longer than the first time period.

8. The apparatus according to claim 7, wherein the control circuit is configured to periodically send the at least one dummy message at a pre-configured interval that is shorter than the first time period.

9. The apparatus according to claim 7, wherein the at least one dummy message is a dummy SIP OPTIONS message.

10. The apparatus according to claim 7, wherein the control circuit is configured to determine that the identified UE enters into ringing phase based on one of receipt of a ringing message from the identified UE and sending of a ringing message to the identified UE.

11. The apparatus according to claim 7, wherein the first time period is set so that, if the radio resource is unused for exchanging data packet in the first time period, the radio resource is released.

12. The apparatus according to claim 7, wherein the control circuit is configured to send at least one dummy message to both the originating UE and the terminating UE of the VoLTE call if the identification circuit identifies the originating UE and the terminating UE as being in LTE coverage.

13. A non-transitory storage medium storing a computer program which, when executed, cause an apparatus on which the computer program is executed to establish a Voice over LTE (VoLTE) call in a communication network by:
receiving a request for establishing the VoLTE call;
identifying a user equipment (UE) involved in the VoLTE call that is in LTE coverage;
sending at least one dummy message to the identified UE after the VoLTE call enters into ringing phase, an interval between successive dummy messages being shorter than a first time period set for determining whether to release radio resource in LTE coverage for supporting the VoLTE call;

stopping sending the at least one dummy message if the VoLTE call is one of answered and cancelled; and the VoLTE call entering into ringing phase is determined based on one of receipt of a ringing message from the identified UE and sending of a ringing message to the identified UE.

14. The non-transitory storage medium according to claim 13, wherein sending the at least one dummy message comprises periodically sending the at least one dummy message at a pre-configured interval that is shorter than the first time period.

15. The non-transitory storage medium according to claim 13, wherein the at least one dummy message is a dummy SIP OPTIONS message.

16. The non-transitory storage medium according to claim 13, wherein the first time period is set so that, if the radio resource is unused for exchanging data packet in the first time period, the radio resource is released.

17. The non-transitory storage medium according to claim 13, wherein the VoLTE call is determined as being cancelled when one of receiving a cancel message from an originating UE of the VoLTE call or and receiving no answer message from a terminating UE of the VoLTE call over a second time period that is longer than the first time period.

\* \* \* \* \*